United States Patent [19]

Marshall et al.

[11] Patent Number: 4,825,441
[45] Date of Patent: Apr. 25, 1989

[54] FREE ELECTRON LASER USING A RELATIVISTIC BEAM WITH SPIRALLING ELECTRON

[75] Inventors: Thomas C. Marshall; S. Perry Schlesinger, both of New York; Arthur A. Grossman, Bronx; Shien-Chi Chen, New York, all of N.Y.

[73] Assignee: The United States of America as represented by the Secretary of the Navy, Washington, D.C.

[21] Appl. No.: 575,425

[22] Filed: Jan. 31, 1984

[51] Int. Cl.$^4$ .............................................. H01S 3/00
[52] U.S. Cl. ......................................... 372/2; 372/37
[58] Field of Search ........................................ 372/2, 37

[56] References Cited

U.S. PATENT DOCUMENTS

| | | | |
|---|---|---|---|
| 3,822,410 | 7/1974 | Madey | 372/2 |
| 4,189,686 | 2/1980 | Bran et al. | 372/2 |
| 4,345,329 | 8/1982 | Doucet et al. | 372/2 |
| 4,479,218 | 10/1984 | Bran et al. | 372/2 |
| 4,500,843 | 2/1985 | Szoke et al. | 372/2 |
| 4,506,229 | 3/1985 | Prosnitz et al. | 372/2 |
| 4,511,850 | 4/1985 | Schlitt et al. | 372/2 |
| 4,530,096 | 7/1985 | Beketi et al. | 372/2 |
| 4,531,076 | 7/1985 | Holder | 372/2 |

Primary Examiner—William L. Sikes
Assistant Examiner—Robert E. Wise
Attorney, Agent, or Firm—Prithvi C. Lall; Arthur A. McGill; Michael J. McGowan

[57] ABSTRACT

A free electron laser (FEL) is described which is used for generating high power radiation in a region of increasing guiding magnetic field before injection into an undulating low magnetic field. It includes an electron beam propagating along a guiding magnetic field $B_0$ (approximately 10 kilo gauss) inside a hollow metallic tube used as a wave guide. Around the path of the beam, an undulator in the form of a bifilar helical winding or the like produces a periodic magnetic field $B_1$ (approximately 0.5 to 1.0 kG). The electron motion accordingly has a substantial transverse component and the motion at the cyclotron and undulator frequencies occurs. Due to the energy exchange between the gyrating component of electron motion and an electromagnetic wave already present in the hollow tube, radiation of a calculable frequency is amplified.

7 Claims, 1 Drawing Sheet

FREE ELECTRON LASER USING A RELATIVISTIC BEAM WITH SPIRALLING ELECTRON

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention relates to generation of high power radiation and more particularly to a continuously tunable free electron laser operating in the millimeter-submillimeter spectral range.

(2) Background of the Invention

Coherent radiation sources in the millimeter-submillimeter spectral range are typically molecular lasers which operate at fixed frequencies. A more recent development is that of a free electron laser (FEL). A description of this device is given in an article by D. A. G. Deacon et al, Physical Review Letters, Vol. 38, pp. 892–894, (April 1977) which is incorporated herein by reference. The free electron laser (FEL) of Deacon et al is driven by a low current beam from a linear accelerator and has limited peak power. It is best adapted to operate only in the near infrared spectrum.

Another device using the FEL principle is disclosed in U.S. Pat. No. 3,958,189 issued to Philip A. Sprangle et al which is also incorporated herein by reference. However, it requires a powerful electromagnetic pump wave to achieve amplification and is therefore difficult to realize.

Another adaptation of the FEL device is based upon a paper by D. B. McDermott et al in Physical Review Letters, Vol. 41, pp. 1368–1371, (1978) which is described and claimed in the patent application which matured into U.S. Pat. No. 4,331,936 to Schlesinger et al on May 25, 1982. Both above-identified McDermott et al article and U.S. Pat. No. 4,331,936 are incorporated herein by reference. However, the Schlesinger device utilizes a high gain interaction between the light wave and the electron beam using the principle of stimulated Raman Backscattering.

Another device for generating high power pulses of coherent electromagnetic radiation is called a gyrotron which is a device well-adapted to efficient generation of coherent powers in the wavelength range of a few centimeters to a few millimeter. The gyratron employs a beam of moderately energetic electrons which spiral in a magnetic field and interact with the radiation at their cyclotron frequency in a single-or multimode resonant cavity. Reliable operation of the gyrotron at wavelength of a millimeter or so is however very difficult as it requires high magnetic field and very stable resonator properties.

Still another source of coherent electro-magnetic radiation in this range by Bekefi et al (Coherent Radiation from a Relativistic Electron Beam in a Longitudinal, Periodic Magnetic Field by W. A. McMullin and G. Bekefi, Applied Physics Letters, Vol. 39(10), pp. 845–847 (1981) which is incorporated herein by reference) uses a beam of gyrating electrons which is compressed to its paraxial position by means of a solenoidal magnetic field around the waveguide. This electron beam is then subjected to a transverse motion in an interaction region by a longitudinal ripple (wiggler) magnetic field which is generated by a periodic assembly of rings magnetized in the axial direction. The electron beam during its accelerated motion generates or amplifies coherent electromagnetic radiation in the millimeter or submillimeter range. However, the requirement that the electron beam be adiabatically compressed along the axial position imposes stringent requirements on the performance of this device. It is thus desirable to have a device which will generate coherent electro-magnetic radiation in the submillimeter-millimeter range which is tunable continuously and which provides a flexibility of design so as to the strength of the electron beam and the size of the drift tube.

SUMMARY OF THE INVENTION

According to the teachings of subject invention, an electron beam, having energy about 1 MeV (1 MeV = 1 million electron volts) is propagated along a guiding magnetic field ($B_0$) which is about 10 kG (kG = 1 kilo gauss) inside a hollow metallic tube used as a waveguide. Around the path of the beam is located an undulator (wiggler), an arrangement which can produce a periodic magnetic field (period 1 centimeter or so) of amplitude $B_\perp$ (500–1000 gauss). The undulator may be either in the form of bifilar helical winding, magnetic mirror "cusp" windings, or dipole windings. The energy of the electron beam is characterized by $(\gamma-1)mc^2$, where $mc^2$ is the rest energy of electron, and $\gamma$ is $(1-v_\perp^2/c^2-v_\parallel^2/c^2)^{-\frac{1}{2}}$ where $v_\perp$ and $v_\parallel$ are the electronic velocity components normal and parallel to $B_0$. As a result of the energy exchange between the gyrating component of the electron motion (e.g., the value of $v_\perp$ prior to electron entry into the undulator) and an electromagnetic wave already present in the hollow pipe, radiation having radian frequency $\omega_s$ $$\omega_s = (\omega_c + 2\pi v_\parallel/l)(1-v_\parallel/c)^{-1}$$

ps where $\omega_c = eB_0/\gamma mc$, is amplified.

An object of subject invention is to have a free electron laser device for high power coherent radiation in the millimeters-submillimeter range which is continuously tunable.

Another object of subject invention is to have high power source of coherent radiation which does not require an expensive high energy accelerator.

Still another object of subject invention is to have a high power source of coherent radiation which has a high gain.

Still another object of subject invention is to have a high power coherent radiation source in the millimeters-submillimeter range wherein pump wave is provided by a simple magnetostatic ripple magnetic field or wiggler field provided by a helical or cusp-coil winding.

Another object of subject invention is to have a high power source of coherent radiation which does not require electron beam having very low energy-spread.

Still another object of subject invention is to have a high power source of coherent radiation which can use relatively weak magnetic field and which can use a multimode Fabry Perot resonator.

Still another object of subject invention is to have a high power source of coherent radiation in the submillimeter-millimeter range which can generate harmonic radiation.

DESCRIPTION OF PREFERRED EMBODIMENTS

Subject invention includes apparatus and technique adapted to generate very high power of coherent electromagnetic radiation in the millimeter and submillimeter range which is continuously tunable. It should be clearly understood that this device is different from the device of Deacon et al which requires an expensive high energy (e.g., 50 MeV) accelerator facility and which also has a very low gain. Unlike the FEL of Sprangle et al, the pump wave in subject device is provided by a simple magnetostatic ripple magnetic field, provided by a helical or cusp coil winding. It should further be understood that unlike the FEL device of McDermott et al, the device according to the teachings of subject invention does not require an electron beam having very low energy-spread. Furthermore, unlike a gyrotron, the device of subject invention uses comparatively weak magnetic field and also can use a multimode Fabry-Perot resonator. It should further be noted that the device according to the teachings of subject invention is different from the device of Bekefi et al which requires that the electron beam to be compressed towards the axial line for the operation thereof. This puts quite a stringent design limitation on the lowbitron of McMullin and Bekefi which does not require any specific geometry for the resonant cavity. However, the flexibility of design is provided by the device of subject invention in that it deals with a hollow beam which has both axial as well as transverse components of the wiggler field as opposed to the longitudinal or axial component in case of the lowbitron of Bekefi et al.

Figure 1:
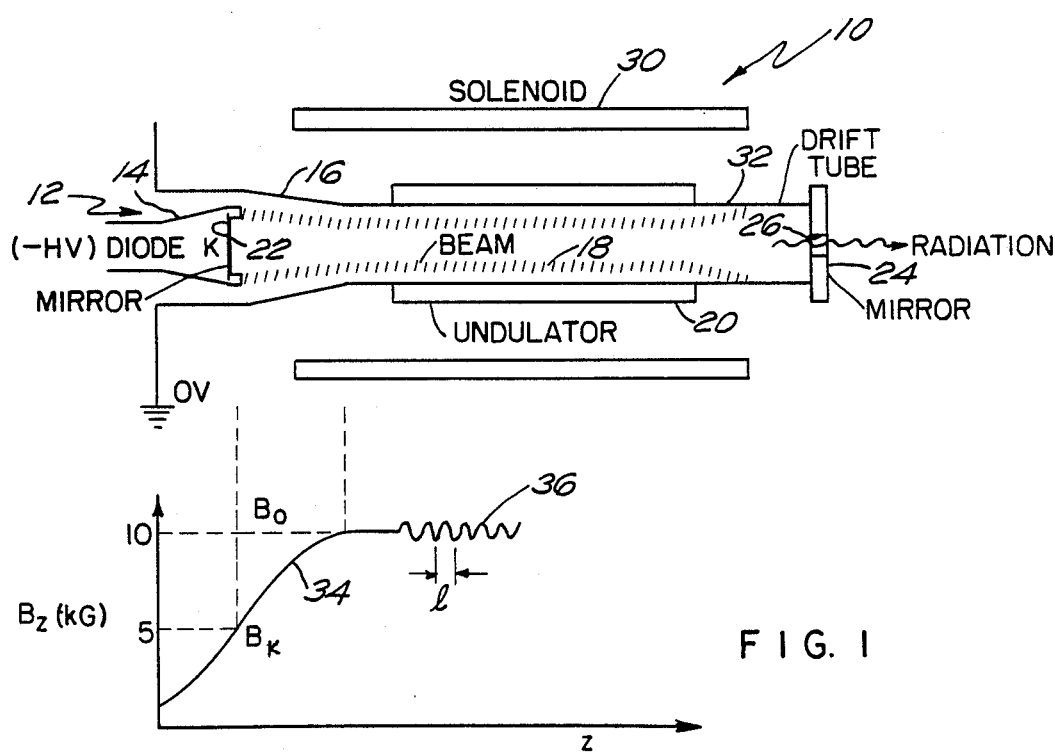
FIG. 1 is a diagramatic view of an embodiment of the device built according to the teachings of subject invention.

Referring now to the drawings, FIG. 1 is a diagramatic view of the oscillator 10. Furthermore, FIG. 1 also shows the profiles of the guiding and wiggler magnetic fields. The device includes an intense relativistic electron beam generator 12 having a cathode 14 which projects into a tapered anode 16. The electron beam 18 is field-emitted from graphite cathode 14 and passes through the magnetic field zone of the undulator 20. The FEL is evacuated to a pressure of less than $10^{-4}$ torr (1 torr=1 mm of Hg) by an auxiliary vacuum station. The frequency of subject FEL can be changed by varying the beam energy or undulator period by any standard means. Radiation is confined in the FEL by mirrors 22 and 24. Mirror 22 is located on the cathode 14 and mirror 24 has a small output coupling hole 26 for the coherent radiation to exit. This establishes a resonant cavity within which the electro magnetic rays are reflected. The current density of the electron beam must be of the order of 1 kA/cm$^2$ and the permissible variation of accelerator voltage fluctuation during the output pulses about 1 percent. The design of the FEL as shown in FIG. 1 requires that the two mirrors feed-back at least 50 percent of the radiation per bounce. At wavelength of about 1 mm, the mirrors can be simple polished graphite or stainless-steel disks. The waveguide (i.e., drift-tube) 32 is tapered in such a way that the metallic wall remains on a surface enclosing constant magnetic flux. The cathode surface, magnetic field, and the accelerator voltage at the cathode are chosen to generate a given value of $\beta_{\perp k}$ ($=v_\perp/c$ at the cathode), $$\beta_{\perp k} 167\ 3.3 \times 10^{-6}\ E_{\perp k}/B_k \text{ (kG.)}$$

where $E_{\perp k}$ is the transverse component of DC (v/cm) Electric field at the cathode 14. A certain variation of the cathode and anode surface is necessary to assure that the electron beam emitted in the presence of space charge is sufficiently cold for the actual design chosen. The increasing magnetic field $B_0$ provided by solenoid 30 thereby causes an increase in downstream according to $\beta_\perp \approx \alpha^{\frac{1}{2}} \beta_{\perp k}$ while the beam radius r decreases as $R_B = \alpha^{-\frac{1}{2}} R_k$ where $\alpha \equiv B_0/B_{0k}$. The succesful operation of the new FEL device requires $\beta_\perp \sim 0.4$ at the point of entry into the undulator. The profile of the magnetic field which is provided by solenoid 30 is also shown in FIG. 1 wherein the magnetic field B changes from a low value to a value of 10 kG as shown by curve 34. The wiggler magnetic field shown by curve 36 which is provided by the undulator 20 wherein the period of the wiggler field is designated as 1.

Figure 2:
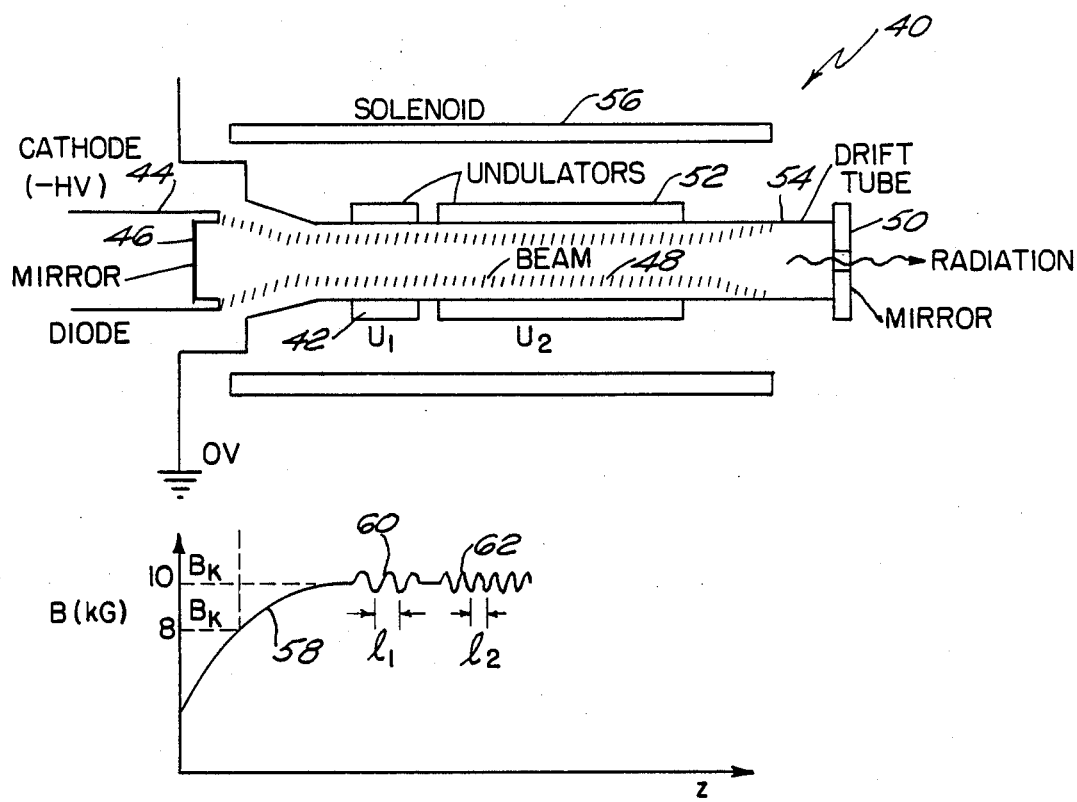
FIG. 2 is a schematic representation of another embodiment of the device built according to the teachings of subject invention.

FIG. 2 represents another embodiment of the oscillator 40 of high power coherent radiation according to the teachings of subject invention. The required $\beta_\perp$ motion is imparted to the beam electrons through interpositioning of a short, separated undulator 42 which is magnetoresonant. The arrangement shows a planar cathode 44, incorporating a mirror 46. The undulator 42 has period $l_1$ of its winding chosen such that $$2\pi \beta_\parallel c/l_1 \approx eB_0/mc\gamma.$$

Undulator 42 need only be about 4 periods long and can use $B_{\perp L} < 500$ G. Oscillation of the FEL is caused by undulator 52 which has a different period of 2. The profiles of the magnetic fields generated by solenoid 56, undulator 42 and undulator 52 are shown in FIG. 2 wherein curve 58 shows the growth of the guiding field created by solenoid 56 and curve 60 shows the variation of field created by undulator 42 and curve 62 shows the variation of the magnetic field created by undulator 52. The electron beam 48 is contained in the drift tube 54. As can be seen in both FIGS. 1 and 2 the electron beams 18 and 48 are of annular type and they are contained in the respective drift tubes 32 and 54. The physics of the device is such that the geometry of the drift tube and the radius of the beam determine the range of the coherent radiation produced by these devices. These characteristics give flexibility to the range of the coherent radiation produced. This flexibility is completely opposite to the lowbitron device of Bekefi et al wherein the requirement for the electron beam inside the drift tube to be adiabatically compressed is such that the electron beam is pinched along the axial line and the undulator field is along the longitudinal direction only whereas the wiggler magnetic field in the device of the subject invention include both transverse and longitudinal components thereof. It should be further noted that the embodiments shown in FIGS. 1 and 2 preferably include field-emission type diodes which are suitable for short pulse (i.e., less than $\frac{1}{4}$ microsecond) accelerators.

However, the design of the FEL is compatible with hot cathode diodes which are capable of long-pulse operation up to at least one microsecond, with perhaps 1000 pulses per second supplied by a simple Marx generator or induction linear accelerator system. In such a system, the required beam current density (about 1 kA/cm$^2$) can be obtained in an electron beam carrying about 100 amps, having diameter about 3 mm. A hot cathode surface, emitting about 10 amp cm$^2$, would be positioned upstream from the undulator in an appropriately weakened $B_0$ field (a few hundred gauss) so as to compress the emitted electron stream to the proper diameter. In principle, it is possible to prepare cold electron stream with the required $v_\perp$ and $v_\parallel$ by appropriate choice of $E_{\perp k}$, $B_k$, $B_0$, providing the acceleration of the beam is divided into stages with separate control anodes.

The physics of the devices shown in FIGS. 1 and 2 is discussed extensively in articles by Grossman et al: A New Millimeter Free Electron Laser Using a Relativstic Beam With Spiralling Electrons; A. Grossman, T. C. Marshall and S. P. Schlesigner, Phys. Fluids, Vol. 26(1), January 1983, pp. 337–343 and "A Free Electron Laser Oscillator Based on Cyclotron-Undulator Interaction"; Arthur A. Grossman and T. C. Marshall, IEEE Journal of Quantum Electronics, Vol. QE-19, No. 3, March 1983, pp. 334–339. These articles are incorporated herein by reference. It is shown there that the positive-energy cyclotron mode of the beam is coupled to the guided electromagnetic waves of the drift tube pipe by means of the transverse motion ($v_\perp$) of the electrons. Oscillation at frequency $\omega_s \approx (\omega_c + 2\pi v_\parallel / l)(1 - v_\parallel/c)^{-1}$ which employs the double-doppler shift of the undulator period and the cyclotron frequency, is thereby made possible, given: (1) sufficiently large $\beta_\perp$ (about 0.4); (2) sufficiently cold parallel motion of the electrons ($\Delta v_\parallel /c$, electron velocity spread, of about 2 percent); (3) sufficiently large $B_\perp$ in the wiggler ($B_\perp$ = about 1 kG); (4) sufficient resonant feedback (5) and sufficiently long undulator. In the articles cited above, a simple calculation of growth rate is presented and compatible parameters are a growth rate to be about $10^9$ sec$^{-1}$ and resonant power feedback of about 50 percent per bounce. The corresponding growth distance $\Gamma^{-1}$ is about 30 centimeter and the system gain/pass, $\Gamma L$ is about 1 where L is the undulator length. However, different but compatible parameters of the beam system and the resonant system can be chosen according to the scaling relationships described in these papers. It should further be noted that the undulator length L is chosen so that at least 50 magnetostatic periods are imposed. This provides a resonably monochromatic pump wave, and it is demonstrated that spectral width of radiation emitted from this FEL is at least as narrow as the spectrum of the undulator as shown to a moving electron.

It should further be noted that in the design of the Fabry-Perot resonator, it is essential that resonator be "open" (open lateral wall) over some zone of the interaction, such that off-axis resonant FEL modes may be filtered out which is unlike the device of Bekefi et al.

Thus the basic concept of a novel source of coherent electro magnetic radiation capable of generating (or amplifying) waves in the millimeter and submillimeter wavelength range has been described. It employs an annular electron beam which is affected by a guiding field provided by a solenoid so as to change the transverse component of the velocity of the electron beam and to form the electron beam close to the drift tube. The undulator field is provided which has transverse and longitudinal components. The interaction of the electron beam with the wiggler magnetic field then provides the electro magnetic radiation in the millimeter and submillimeter range of wavelengths.

It should be noted that while the invention has been described in the preferred embodiments described above, it should be understood the words used are words of description instead of words of limitation. It is therefore understood that within the scope of the appended claims, the invention may be practiced otherwise than as specifically described.

What is claimed is:

1. A method for generating continuously tunable coherent radiation having wavelength in the millimeter and submillimeter range in a longitudinal drift tube comprising the steps of:
   generating a relativistic electron beam having a transverse velocity component and the corresponding longitudinal velocity component thereof along the axis of said drift tube so as to obtain a non-adiabatically compressed electron beam;
   converting the longitudinal velocity of said relativistic electron beam into a transverse velocity component thereof and produce a spiralling electron beam;
   subjecting said electron beam to a wiggler magnetic field having both longitudinal and transverse components thereof in said drift tube; and
   extracting coherent radiation generated as a result of interaction between said electron beam and the wiggler magnetic field in said drift tube.

2. The method of claim 1 which includes the step of subjecting said relativistic electron beam to a guiding solenoidal magnetic field before subjecting it to said wiggler magnetic field.

3. The method of claim 2 wherein the step of extracting coherent radiation generated in said drift tube further includes the step of passing said coherent radiation through an opening in a mirror means.

4. The method of claim 3 which further includes the step of adjusting the magnitude of the guiding solenoidal magnetic field and the energy of said relativistic electron beam and the magnitude of the wiggler magnetic field so as to obtain an annlar relativistic electron beam.

5. A method for generating continuously tunable coherent radiation in the millimeter-submillimeter range in a drift tube by interacting a relativistic electron beam with a guiding magnetic field and an undulating magnetic field in a drift tube which includes the steps of:
   generating a relativistic electron beam;
   guiding said relativistic electron beam in said drift tube using said guiding magnetic field to form a beam of spiralling electron beam; and
   subjecting the guided relativistic electron beam to said wiggler magnetic field having both longitudinal and transverse components thereof in said drift tube for interaction between said guide relativistic electron beam and said wiggler magnetic field to generate coherent radiation; and
   extracting the coherent radiation generated in said drift tube.

6. A source of coherent radiation in the millimeter-submillimeter range which comprises:
   a hollow metallic longitudinal drift tube;

a source of relativistic electron beam located at a first end of said longitudinal drift tube;

means for guiding said relativistic electron beam to form a spiralling electron beam inside said longitudinal drift tube;

means for generating undulating magnetic field having both longitudinal and transverse components thereof in said longitudinal drift tube; and means for extracting coherent radiation at the end opposite the first end of said longitudinal drift tube.

7. The source of claim 6 wherein said means for guiding said relativistic electron beam in said drift tube includes a solenoid for generating a magnetic field.

* * * * *